US007505182B2

(12) United States Patent
Suzuki et al.

(10) Patent No.: US 7,505,182 B2
(45) Date of Patent: Mar. 17, 2009

(54) IMAGE PROCESSING APPARATUS, AND IMAGE READING AREA SETTING METHOD

(75) Inventors: Makoto Suzuki, Ichinomiya (JP); Yoshinari Okamoto, Toyoake (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 965 days.

(21) Appl. No.: 10/745,546

(22) Filed: Dec. 29, 2003

(65) Prior Publication Data

US 2004/0160626 A1 Aug. 19, 2004

(30) Foreign Application Priority Data

Jan. 8, 2003 (JP) ............................. 2003-002420

(51) Int. Cl.
*H04N 1/04* (2006.01)

(52) U.S. Cl. ..................... 358/474; 358/1.15; 358/1.13; 358/453; 399/405; 399/75

(58) Field of Classification Search ................. 358/474, 358/1.15, 487, 486, 398, 402, 443, 400, 444, 358/1.13, 497, 1.2, 538, 453; 399/405, 75
See application file for complete search history.

(56) References Cited

U.S. PATENT DOCUMENTS

| | | | | |
|---|---|---|---|---|
| 4,958,299 | A * | 9/1990 | Akada | 358/1.3 |
| 5,099,291 | A * | 3/1992 | Yoshioka et al. | 399/17 |
| 5,526,096 | A * | 6/1996 | Imada | 399/183 |
| 5,828,465 | A * | 10/1998 | Muramatsu et al. | 358/400 |
| 6,282,387 | B1 * | 8/2001 | Yamada | 399/75 |
| 6,542,715 | B2 * | 4/2003 | Miyamoto et al. | 399/405 |
| 6,870,634 | B1 * | 3/2005 | Morikawa | 358/1.16 |
| 6,943,906 | B2 * | 9/2005 | Murata | 358/1.13 |
| 6,952,290 | B2 * | 10/2005 | Ishido et al. | 358/475 |
| 7,054,028 | B2 * | 5/2006 | Murata | 358/1.16 |
| 2001/0043367 | A1 * | 11/2001 | Ogino | 358/449 |
| 2003/0030831 | A1 * | 2/2003 | Murata | 358/1.11 |

FOREIGN PATENT DOCUMENTS

| | | |
|---|---|---|
| JP | A 5-3535 | 1/1993 |
| JP | A 8-274949 | 10/1996 |
| JP | A 10-285347 | 10/1998 |
| JP | A 11-231726 | 8/1999 |
| JP | A 2000-92282 | 3/2000 |

* cited by examiner

*Primary Examiner*—Negussie Worku
(74) *Attorney, Agent, or Firm*—Oliff & Berridge, PLC

(57) ABSTRACT

An image processing apparatus including an image reading portion operable to read an image on an original, to obtain image information, an image-information outputting portion operable to output the image information to an external device, an image recording portion operable to record an image on a recording medium, on the basis of the image information obtained by the image reading portion, an original-size specifying portion operable to specify a size of the original, a recording-medium-size obtaining portion operable to obtain a size of the, recording medium, and an image-reading-area setting portion operable to set an image reading area of the image reading portion, on the basis of the size of the original specified by the original-size specifying portion, upon operation of the image-information outputting portion, and to set the image reading area, on the basis of the size of the recording medium obtained by the recording-medium-size obtaining portion, upon operation of the image recording portion. Also disclosed is a method of setting the image reading area.

15 Claims, 8 Drawing Sheets

IMAGE PROCESSING APPARATUS, AND IMAGE READING AREA SETTING METHOD

The present application is based on Japanese Patent Application No. 2003-002420 filed Jan. 8, 2003, the contents of which are incorporated herein by reference.

BACKGROUND OF THE INVENTION

1. Field of the Invention

The present invention relates in general to an image processing apparatus including an image reading device operable to read an image on an original, and a method of setting an image reading area of the image reading device.

2. Discussion of Related Art

A known facsimile apparatus equipped with an original platen and having a copying function is arranged to first detect a size of an original placed on an original platen, by performing a pre-scanning operation or by using an original-size sensor, and then read the image on the original according to the detected size of the original, to transmit image information representative of the read image to an external device.

Where the size of the original is detected by performing the pre-scanning operation, the operation to read the image is performed after the pre-scanning operation, so that the facsimile transmission requires a comparatively long time. Where the size of the original is detected with the original-size sensor, without performing the pre-scanning operation, the provision of the original-size sensor increases the cost of manufacture of the facsimile apparatus. To eliminate those drawbacks, there has been proposed an inexpensive, simple facsimile apparatus arranged to efficiently read the image on the original, by reading an entire reading area of the original platen, without detecting the size of the original by the pre-scanning operation or the original-size sensor. The assignee of the present application has manufactured one example of such a facsimile apparatus, which is a multiple-function apparatus commercially available under the trade names “MFC-9700” and “MFC-9800”.

On the other hand, there has been developed a facsimile apparatus equipped with an original platen the reading area of which has a large size to meet a recent demand of the users for increasing the maximum size of the original that can be placed on the original platen. The original has different sizes such as a letter size and a legal size. The letter size and the legal size have the same width dimension and different length dimensions.

When an image carried by an original whose width dimension is smaller than that of the originals of the letter and legal sizes is transmitted by the facsimile apparatus arranged to read the entire reading area of the original platen, as described above, any image if present outside the original is undesirably read, since the reading area of the original platen is larger than the entire surface area of the original. In this case, the image received by an external facsimile apparatus of the receiver from the facsimile apparatus of the transmitter in question is undesirably reduced in size and tends to have reduced legibility by the receiver.

SUMMARY OF THE INVENTION

The present invention was made to solve the problems described above. It is therefore a first object of the present invention to provide an image processing apparatus which eliminates a need of detecting the size of an original by performing a pre-scanning operation or by using an original-size sensor, and which permits setting of the image reading area of the image reading device which is operable to read the original placed on the original platen. A second object of this invention is to provide an improved method of setting the image reading area of the image reading device of the image processing apparatus, without the pre-scanning operation or using the original-size sensor.

The first object indicated above may be achieved according to a first aspect of this invention, which provides an image processing apparatus comprising: an image reading portion operable to read an image on an original, to obtain image information; an image-information outputting portion operable to output the image information to an external device; an image recording portion operable to record an image on a recording medium, on the basis of the image information obtained by the image reading portion; an original-size specifying portion operable to specify a size of the original; a recording-medium-size obtaining portion operable to obtain a size of the recording medium; and an image-reading-area setting portion operable to set an image reading area of the image reading portion, on the basis of the size of the original specified by the original-size specifying portion, upon operation of the image-information outputting portion, and to set the image reading area, on the basis of the size of the recording medium obtained by the recording-medium-size obtaining portion, upon operation of the image recording portion.

In the image processing apparatus constructed according to the first aspect of this invention, the image reading area of the image reading portion is set by the image-reading-area setting portion, on the basis of the size of the original specified by the user through the original-size specifying portion, when the image-information outputting portion is operated to output the image information to the external device. Accordingly, the image-reading-area setting portion prevents the image reading portion from reading an image reading area larger or smaller than the size of the original, without having to use an original-size sensor which would otherwise be required to detect the size of the original. When the image recording portion is operated to record an image on the recording medium on the basis of the image information, the image reading area of the image reading portion is set by the image-reading-area setting portion, on the basis of the size of the recording medium obtained by the recording-medium-size obtaining portion. Accordingly, the image-reading-area setting portion prevents the image reading portion from reading an image reading area larger or smaller than the size of the recording medium.

The second object indicated above may be achieved according to a second aspect of this invention, which provides a method of setting an image reading area of an image reading portion of an image processing apparatus, the image reading portion being operable to read an image on an original, to obtain image information, the image processing apparatus further including an image-information outputting portion operable to output the image information to an external device, and an image recording portion operable to record an image on a recording medium, on the basis of the image information obtained by the image reading portion, the method comprising the steps of: setting the image reading area of the image reading portion, on the basis of a size of the original, upon operation of the image-information outputting portion; and setting the image reading area, on the basis of a size of the recording medium, upon operation of the image recording portion.

In the image-reading-area setting method according to the second aspect of this invention, the image reading area of the image reading portion of the image processing apparatus is set on the basis of the size of the original, when the image-information outputting portion is operated to output the image information to the external device. Accordingly, the image-reading-area setting method prevents the image reading portion from reading an image reading area larger or smaller than the size of the original. When the image recording portion is operated to record an image on the recording medium on the basis of the image information, the image reading area of the image reading portion is set on the basis of the size of the recording medium. Accordingly, the image-reading-area setting portion prevents the image reading portion from reading an image reading area larger or smaller than the size of the recording medium.

BRIEF DESCRIPTION OF THE DRAWINGS

The above and other objects, features, advantages and technical and industrial significance of the present invention will be better understood by reading the following detailed description of a preferred embodiment of the invention, when considered in connection with the accompanying drawings, in which.

DETAILED DESCRIPTION OF THE PREFERRED EMBODIMENTS

Figure 1:
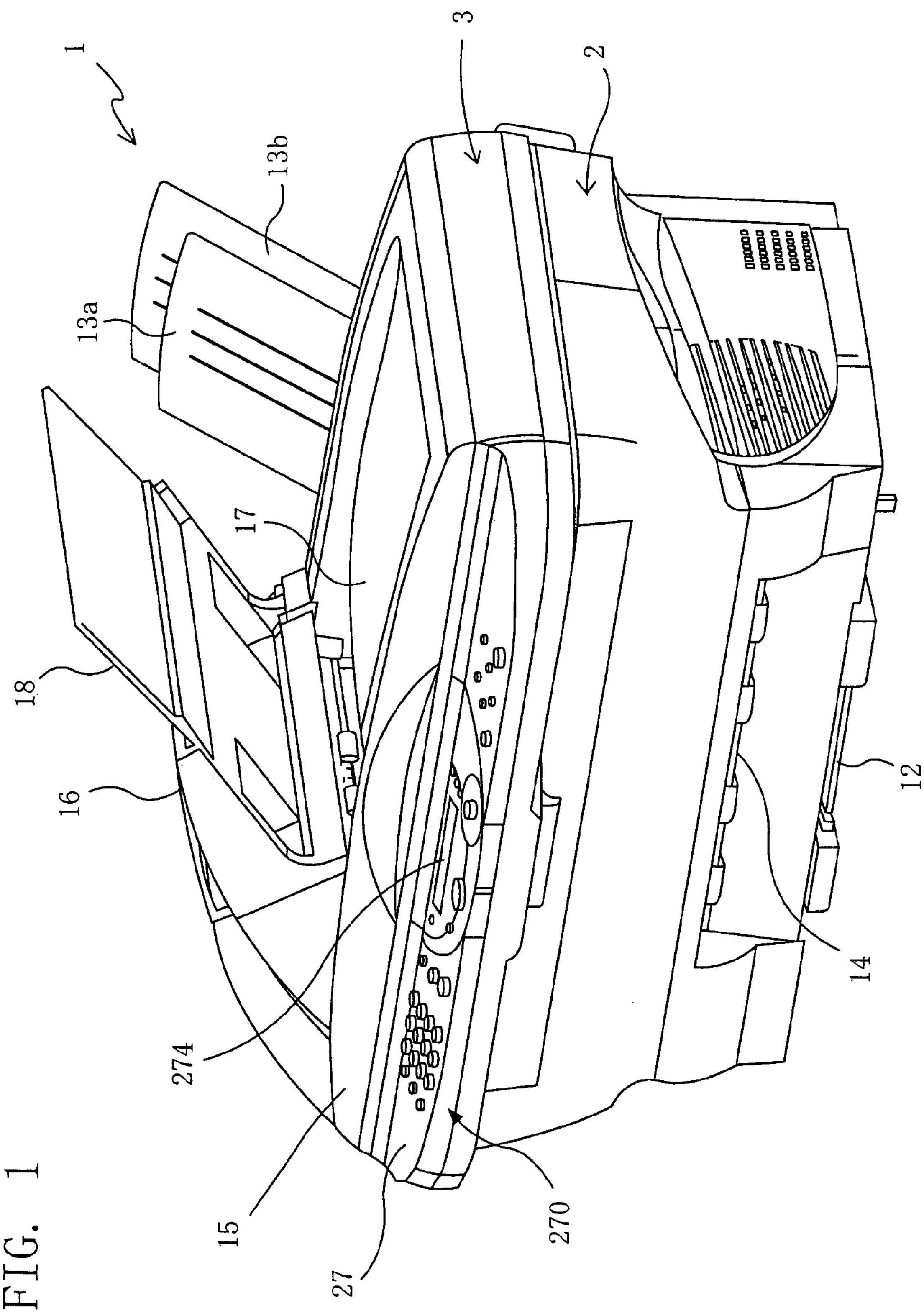
FIG. 1 is a perspective view showing an arrangement of a facsimile apparatus 1 constructed according to one embodiment of this invention.

Referring first to the perspective view of FIG. 1, there is shown an image processing apparatus in the form of a facsimile apparatus 1 which is constructed according to one embodiment of this invention and which has a printing function, a copying function and a scanning function.

As shown in FIG. 1, the facsimile apparatus 1 incorporates a printer portion 2 located in a lower part thereof, a scanner portion 3 located in an upper portion thereof, and a paper supply device (not shown) located on a back side thereof. The facsimile apparatus 1 is further provided with an operator's control panel 27 disposed in a front upper part thereof. The operator's control panel 27 has a liquid crystal display (LCD) 274, and various operator's control keys 270 which will be described. The facsimile apparatus 1 is also provided with an ejected-sheet tray 12 of drawer type located in a front lower part thereof.

The paper supply device includes a first tray 13*a* and a second tray 13*b*, which are provided to hold recording media in the form of respective stacks of paper sheets of different sizes such that the sheet stacks are inclined with respect to the vertical. The paper supply device is provided with a sheet feeding electric motor (not shown), and sheet feeding rolls (not shown), so that each paper sheet is fed from the selected first or second tray 13*a*, 13*b* to the printer portion 2, by the sheet feeding rolls rotated by the sheet feeding electric motor. The paper sheet on which an image has been printed by the printer portion 2 is ejected from the printer portion 2 through an ejector outlet 14 located in the front lower part of the facsimile apparatus 1. The ejected-sheet tray 12 is brought into its operating position for receiving the ejected paper sheets, as needed.

Figure 2:
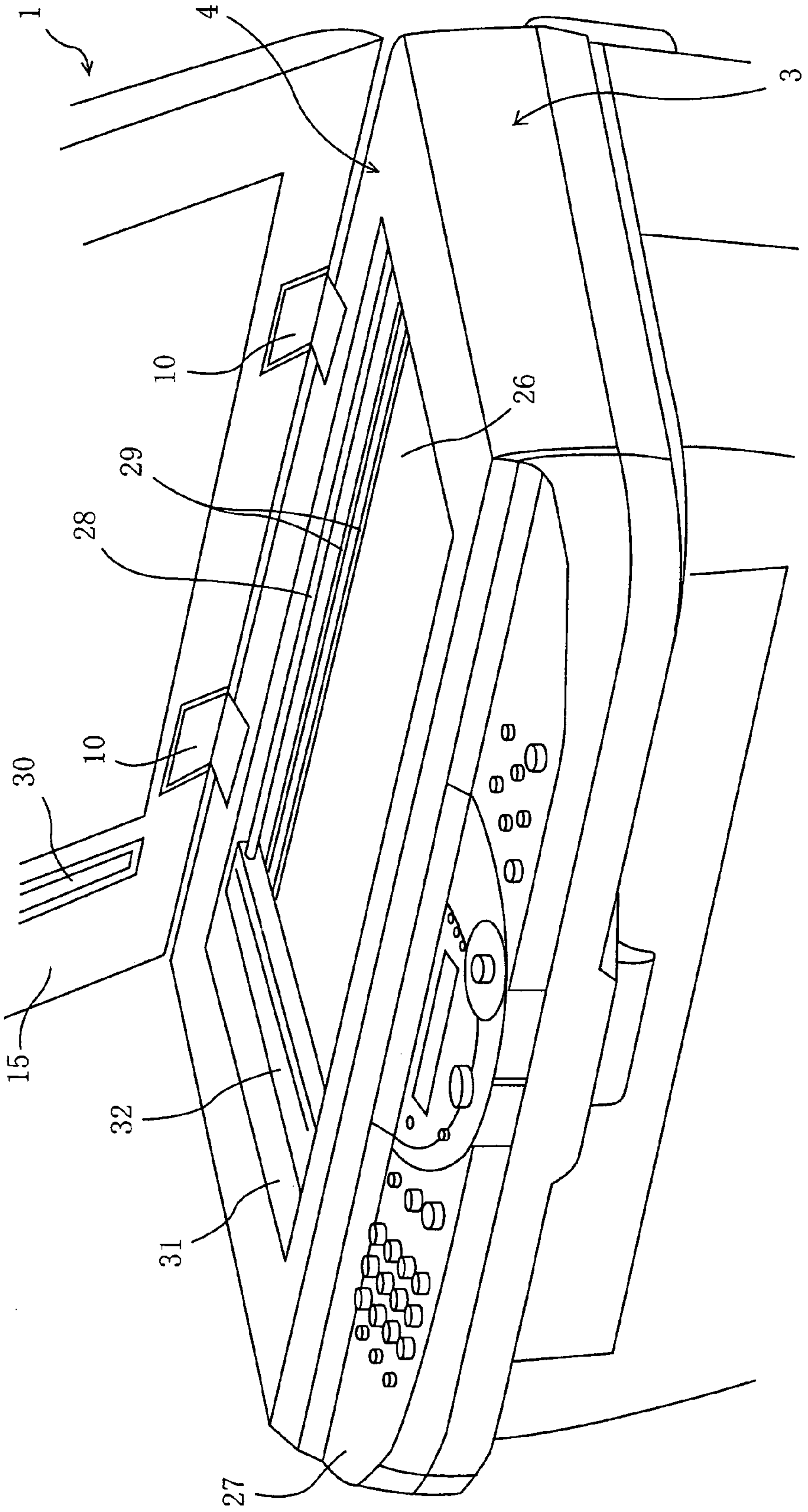
FIG. 2 is a perspective view of the facsimile apparatus 1 when a platen cover 15 is open.

To an original platen 4 located in the upper part of the facsimile apparatus 1, there is hinged a platen cover 15 through hinge portions 10 disposed at the rear end of the original platen, as shown in FIG. 2. The platen cover 15 is pivotable about a horizontal axis, between its open and closed positions.

Then, the scanner portion 3 will be described referring further to the perspective view of FIG. 2 showing the facsimile apparatus 1 with its platen cover 14 held in its open position. The scanner portion 3, which is of a flat-bed type, includes a CCD unit 32 of line scanning type, which is operable to read an image on an original placed on a generally rectangular glass plate 26 of the original platen 4. The CCD unit 32 is supported movably in the longitudinal direction of the glass plate 26, by a guide shaft 28 slidably extending through the rear end portion of the CCD unit 32, and a guide rail (not shown) provided for sliding contact with the front end portion of the CCD unit 32. The CCD unit 32 is connected to a drive belt 29 which is driven by a drive motor (not shown) through a gear mechanism. The CCD unit 32 is moved in the longitudinal direction of the glass plate 26 when the drive motor is operated.

The original cover 15 is provided at its upper left end portion with an ADF (automatic document feeder) mechanism 16, as shown in FIG. 1. This ADF mechanism 16 is arranged to feed a plurality of originals (in the form of paper sheets) one after another from an original supply tray 18 to an ejected-original tray 17 through an original passage aperture 30 (FIG. 2), so that images on those originals are read by the CCD unit 32 when the originals are moved over the CCD unit 32. The original passage aperture 30 of the ADF mechanism 16 is positioned such that the original passage aperture 30 is located right above the CCD unit 32 when the original cover 15 is placed in its closed position.

The original platen 4 is provided with a maintenance or servicing cover 31, which is located on the left side of the glass plate 26 and is removable to facilitate maintenance operations such as cleaning of the scanner portion 3 and replacement of component parts of the scanning portion 3.

Figure 3:
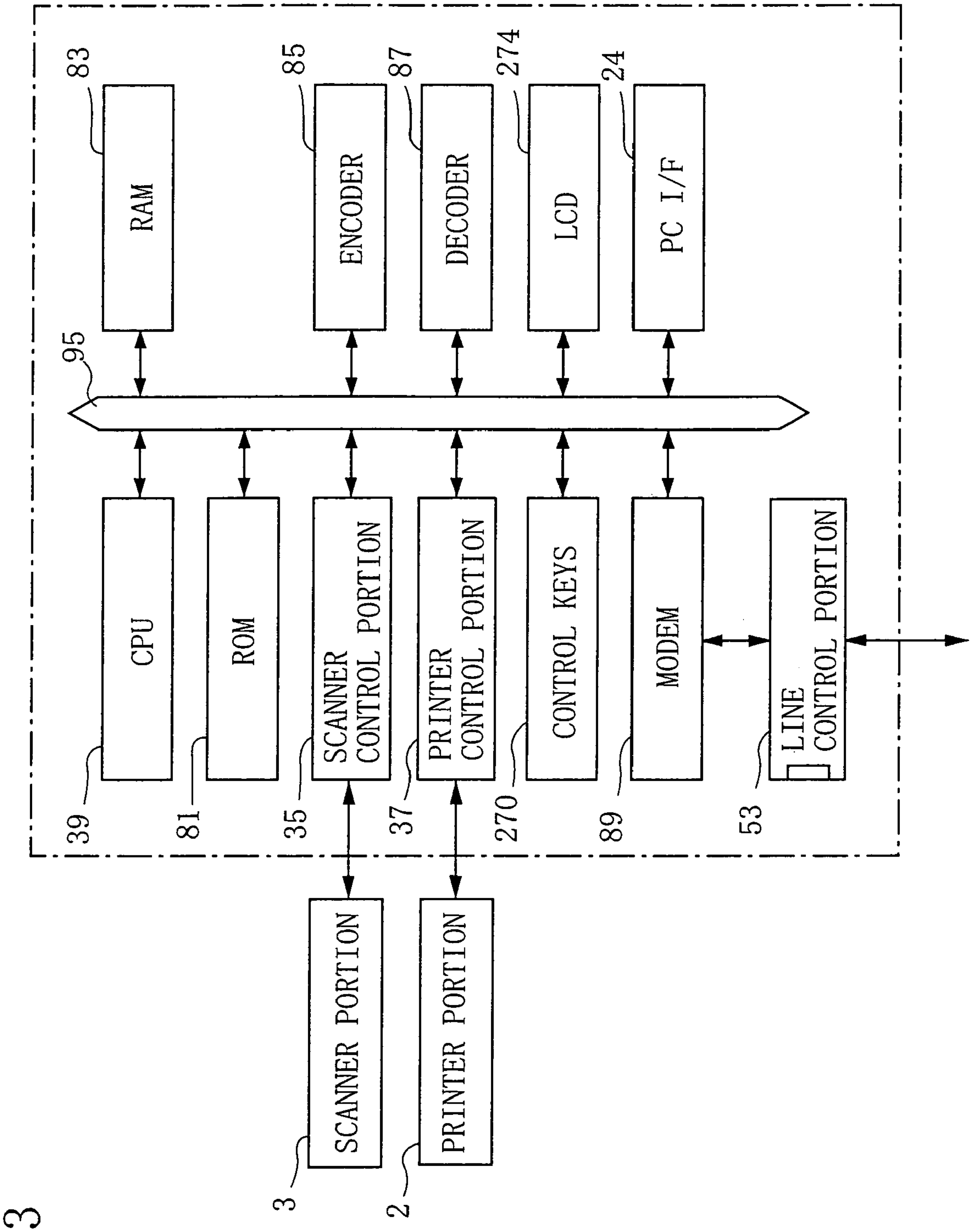
FIG. 3 is a block diagram illustrating functional portions or elements of the facsimile apparatus 1.

Referring next to the block diagram of FIG. 3, there will be described major functional portions or elements incorporated in the facsimile apparatus 1, which include a CPU 39, a ROM 81, a RAM 83, a printer control portion 37, a scanner control portion 35, an encoder 85, a decoder 87, manually operable members in the form of the above-indicated operator's control keys 270, the above-indicated LCD 274, a MODEM (modulator-demodulator) 89, a line control portion 53, and a PC I/F (personal-computer interface) 24, which are interconnected to each other by a bus 95.

The CPU 39 operates to perform various control functions for controlling the present facsimile apparatus 1 as a whole, according to control programs stored in the ROM 81, such as a function of reading an image carried by a desired original, a function of transmitting image information (facsimile data), and a function of copying or reproducing an image on the desired original.

The control programs stored in the ROM 81 include: a group of facsimile transmission control programs used when the facsimile apparatus 1 is operated as a facsimile or telecopier equipment; a group of printing control programs used when the facsimile apparatus 1 is operated as a printer to print an image on a recording medium in the form of a paper sheet, for example; and various other programs such as printer control programs used during execution of the printing control programs, control programs used in a function setting mode, and various kinds of data required for performing various operations according to the above-indicated programs.

The RAM 83 includes working memories used by the CPU 39 to perform various control operations, and temporarily stores various kinds of data.

The scanner control portion 35 is arranged to control the scanner portion 3 to read original images to be transmitted or copied (reproduced), and supply the encoder 85 with image data representative of the read images.

The scanner portion 3 and the scanner control portion 35 for controlling the scanner portion 3 to read the images as described above cooperate with each other to constitute an image reading portion operable to read an image on an original, to obtain image information.

The encoder 85 is arranged to perform an encoding operation to convert the image data received from the scanner control portion 35, into image data in a G3 data compression facsimile transmission format, which are image information to be transmitted to an external facsimile receiver through the MODEM 89. On the other hand, the decoder 87 is arranged to perform a decoding operation to convert the image data in the facsimile transmission format received from an external facsimile transmitter through the MODEM 89, into printing image data in a format that can be processed by the printer control portion 37.

The printer control portion 37 is arranged to control the printer portion 2 for printing a full-color image or a multiple-color image on a recording medium such as a paper sheet, with a selected combination of toners of different colors. The printer portion 2 and the printer control portion 37 for controlling the printer portion 2 to print the image on the recording medium as described above cooperate with each other to constitute an image recording portion operable to record an image on a recording medium, on the basis of the image information obtained by the image reading portion.

The MODEM 89 is provided to transmit and receive facsimile data (image data in the facsimile transmission format) to and from the external facsimile apparatus through the line control portion 53 and a telephone line network. The line control portion 53 is arranged to perform operations to transmit dialing signals to the telephone line network, and reply to call signals received from the telephone line network, so that the present facsimile apparatus 1 is connected to an external facsimile apparatus through the telephone line network, for data communication therebetween.

The PC I/F 24 is used to connect the present facsimile apparatus 1 to an external personal computer (PC), for the facsimile apparatus 1 to receive printing data from the external PC, or to transmit image data read by the scanner portion 3, from the scanner control portion 35 to the external PC.

The line control portion 53 and MODEM 89 for transmitting and receiving facsimile data to and from an external facsimile apparatus through the telephone line network, and the PCI/F 24 cooperate with each other to constitute an image information outputting portion operable to output the image information to an external device.

The operator's control keys 270 are manually operable by the user of the facsimile apparatus 1, to input various command signals for various processing operations to be performed by the facsimile apparatus 1.

The LCD 274 is provided as a display device operable to provide the user with various messages such as prompting messages and error messages, and information for setting various functions of the facsimile apparatus 1.

Figure 4:
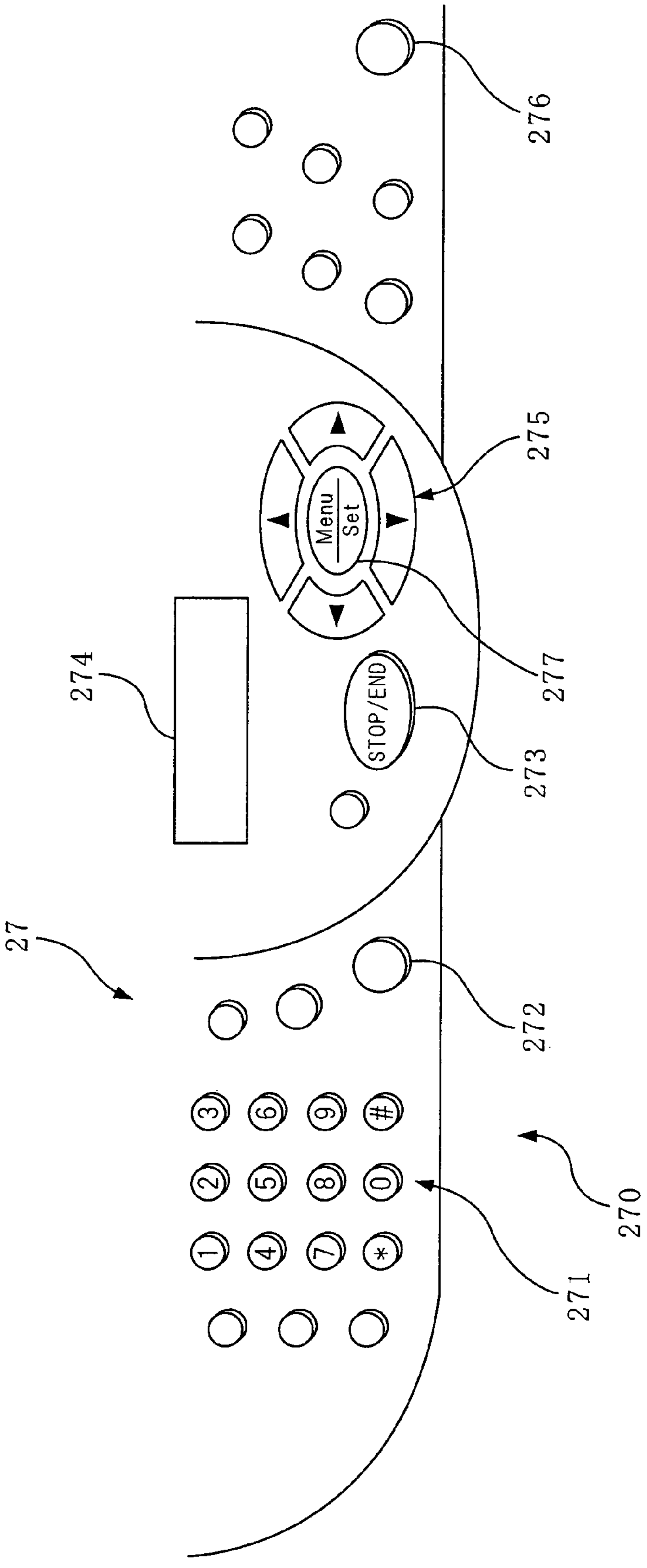
FIG. 4 is a view illustrating an arrangement of an operator's control panel of the facsimile apparatus.

The operator's control panel 27 will be described by reference to the illustration of FIG. 4. The operator's control panel 27 has the operator's control keys 270 and LCD 274 described above. The operator's control keys 270 include: a MENU key 277; four DIRECTION keys 275 for selecting respective upward, downward, leftward and rightward directions; dialing keys 271; a STOP/END key 273; a FAX START key 272; and a COPY key 276.

As described above, the ROM 81 of the present facsimile apparatus 1 stores the various control programs that are executed by the CPU 39 to set various functions in the function setting mode in which the appropriate operator's control keys 270 are operated by the user to set the desired functions of the facsimile apparatus 1. The operations to set the desired functions will be described by reference to FIG. 5 showing the hierarchy of the setting operations.

Figure 5:
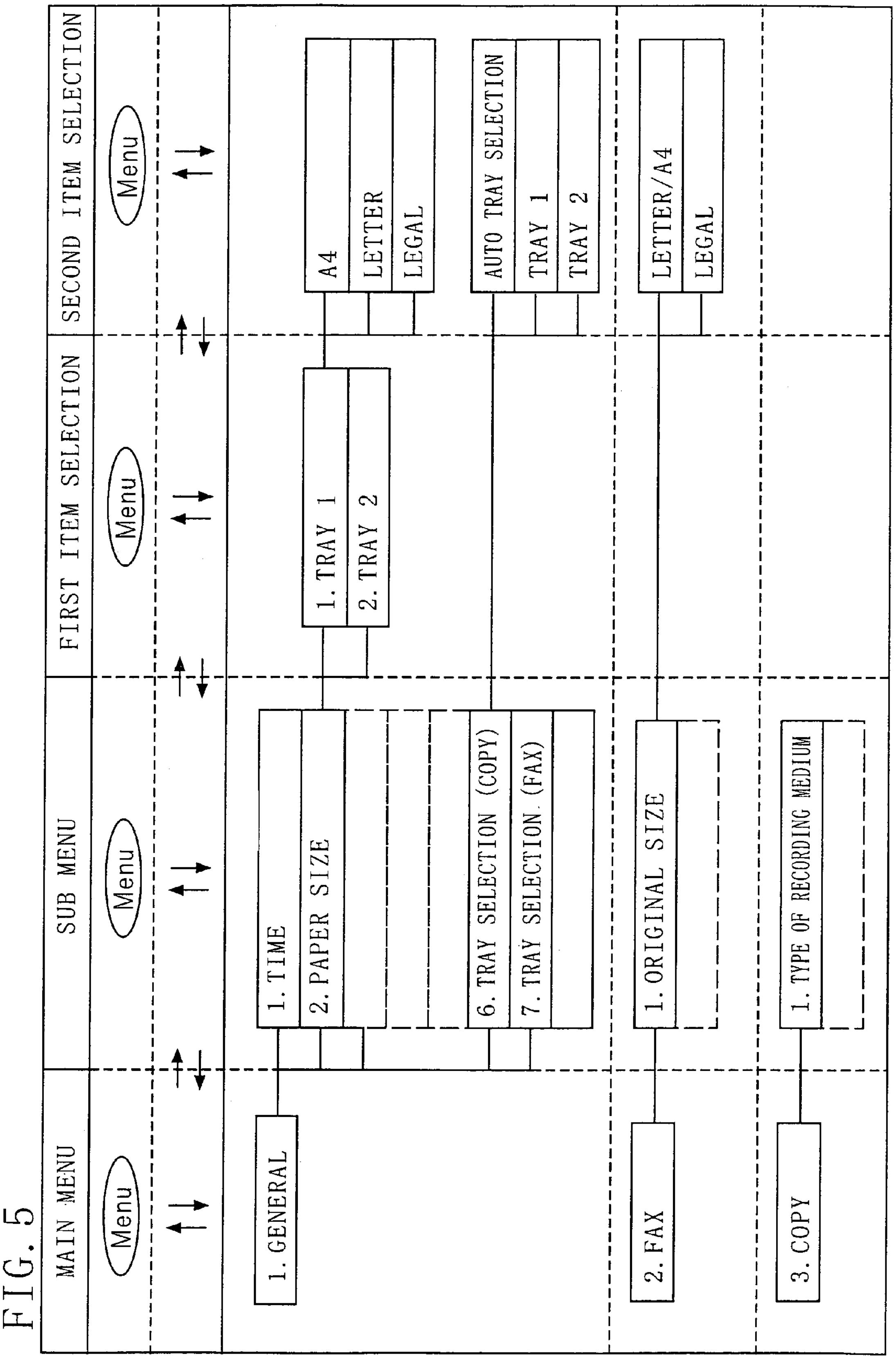
FIG. 5 is a view indicating hierarchy of operations to set the facsimile apparatus in a function setting mode for setting various functions.

The hierarchy of the setting operations includes a main menu operation, a sub menu operation, a first item selecting operation and a second item selecting operation, as indicated in FIG. 5. The setting operations in the function setting mode are performed in the following manner. Initially, the MENU key 277 is pressed to enable the LCD 274 to display the main menu. In this condition, the main menu including a plurality of items displayed on the LCD 274 can be scrolled by pressing the appropriate DIRECTION keys 275 corresponding to the upward and downward directions, and a desired one of the items can be selected by pressing the DIRECTION key 275 corresponding to the rightward direction, or the MENU key 277. Alternatively, the desired item can be selected by specifying the identification number of the desired one of the items of the main menu, with the dialing keys 271. When the desired item of the main menu has been selected, items of the sub menu are displayed on the LCD 274, and a desired one of those items is selectable with the DIRECTION key 275 corresponding to the rightward direction, the MENU key 277 or the dialing keys 271. The menu can be returned from the sub menu to the main menu by pressing the DIRECTION key 275 corresponding to the leftward direction. Similarly, a desired one of items of the first item selection, and a desired one of items of the second item selection can be selected. When one of the items of the second item selection has been selected, the LCD 274 provides an indication that the corresponding function has been set. The operations in the function setting mode can be terminated by pressing the STOP/END key 273.

In the function setting mode, a desired size of the original and a desired size of the recording medium can be set or selected. To set the desired size of the original in the function setting mode, the item 2 "FAX" of the main menu is selected, and the item 1 "ORIGINAL SIZE" of the sub menu is selected. Then, the item "LETTER/A4" or item "LEGAL" is selected in the second item selection. As a result, original size data stored in the RAM 83 are set to indicate the size as selected in the second item selection following the selection of the item 1 "ORIGINAL SIZE" of the sub menu.

To set the desired size of the recording medium in the function setting mode, the item 1 "GENERAL" of the main menu is selected, and the item 2 "PAPER SIZE" of the sub menu is selected. Then, the item 1 "TRAY 1" specifying the first tray 13*a* or the item 2 "TRAY 2" specifying the second tray 13*b* is selected in the first item selection, and the item "A4", "LETTER" or "LEGAL" is selected in the second item selection. As a result, recording-medium size data stored in the RAM 83 are set to indicate the size of the paper sheets in one of the first and second trays 13*a*, 13*b* selected in the first item selection, which size has been selected in the second item selection. The first and second trays 13*a*, 13*b* accommodate respective stacks of paper sheets as recording media.

The function to select one of the TRAY 1 and TRAY 2 is set by selecting the item 1 "GENERAL" of the main menu, and the item 6 "TRAY SELECTION (COPY)" of the sub menu, and then selecting one of the items "AUTO TRAY SELECTION", "TRAY1" and "TRAY 2" in the second item selection. As a result, tray selection data stored in the RAM 83 are set to indicate the tray selection mode as selected in the second item selection following the selection of the item 6 "TRAY SELECTION (COPY)" of the sub menu.

The operator's control keys 270 used to select or specify the size of the original and the size of the recording medium function as an original size specifying portion, and an input device, which is operable to specify the size of the original.

Referring next to the flow charts of FIGS. 6 and 7, there will be described an image reading routine executed by the CPU 39. This image reading routine illustrated in these flow charts is executed, upon pressing of the FAX START key 272 to effect facsimile transmission of an image on an original, or the COPY key 276 to effect copying or reproduction of the image, so that the image is read by the scanner portion 3.

A control program for executing the image reading routine is stored in the ROM 81, and executed by the CPU 39. The image reading routine is initiated with step S110 to determine whether the FAX START key 272 has been pressed by the user to effect the facsimile transmission. If an affirmative decision (YES) is obtained in step S110, the control flow goes to step S210 in which the CPU 39 obtains the original size data which are stored in the RAM 83 and which have been set by selecting the item 2 "FAX" of the main menu, the item 1 "ORIGINAL SIZE" of the sub menu, and one of the items "LETTER/A4" and "LEGAL" in the second item selection.

If a negative decision (NO) is obtained in step S110, the control flow goes to step S120 to determine whether the COPY key 276 has been pressed by the user to effect the copying operation. If an affirmative decision (YES) is obtained in step S120, the control flow goes to step S220 in which a recording-medium-size obtaining routine is executed as described below by reference to the flow chart of FIG. 7. If a negative decision (NO) is obtained in step S120, it means that neither the FAX START key 272 nor the COPY key 276 has been pressed by the user. In this case, the control flow goes to step S230 to effect any other processing operation.

Figure 6:
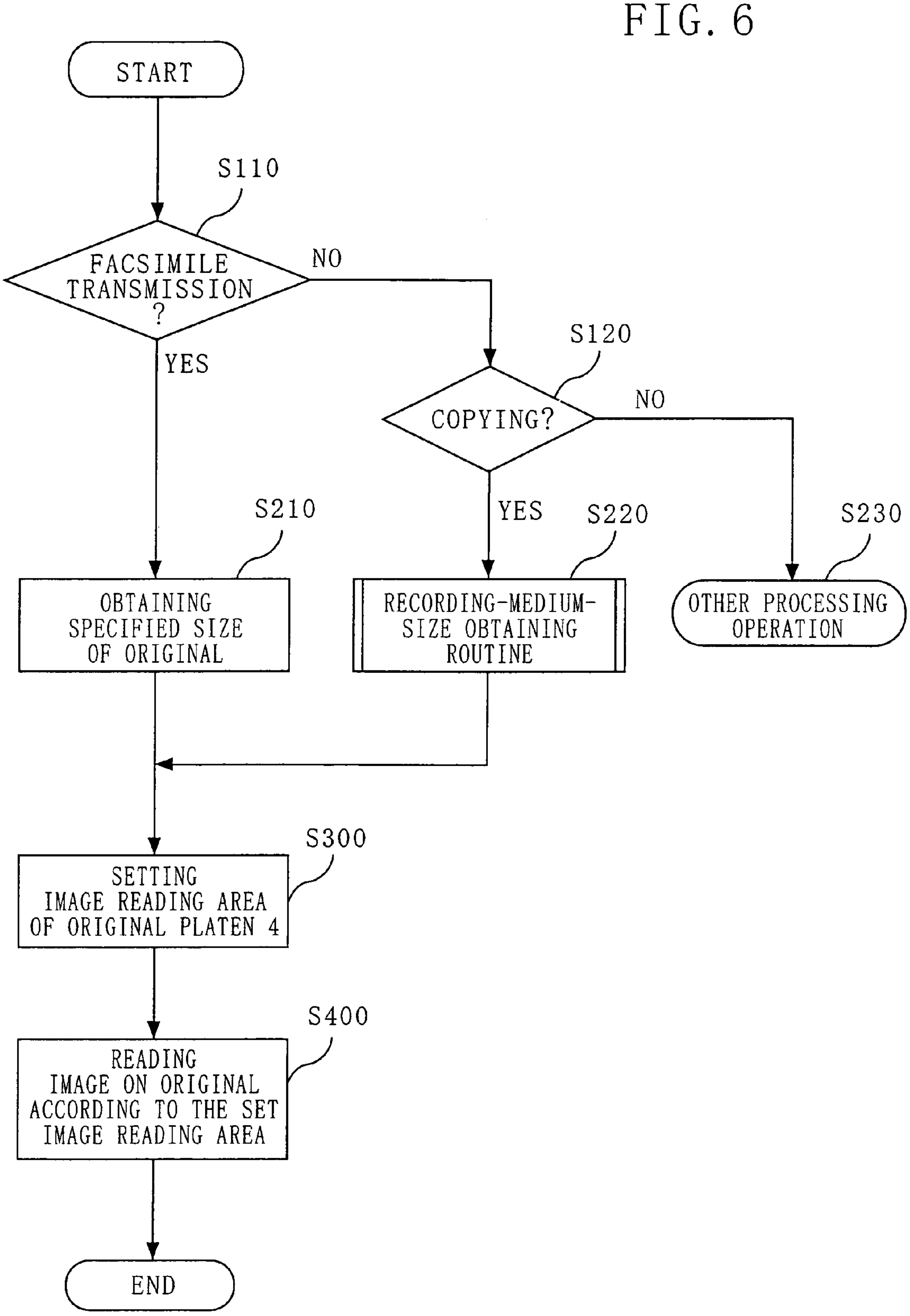
FIG. 6 is a flow chart illustrating an image reading routine executed by the facsimile apparatus 1.
Figure 7:
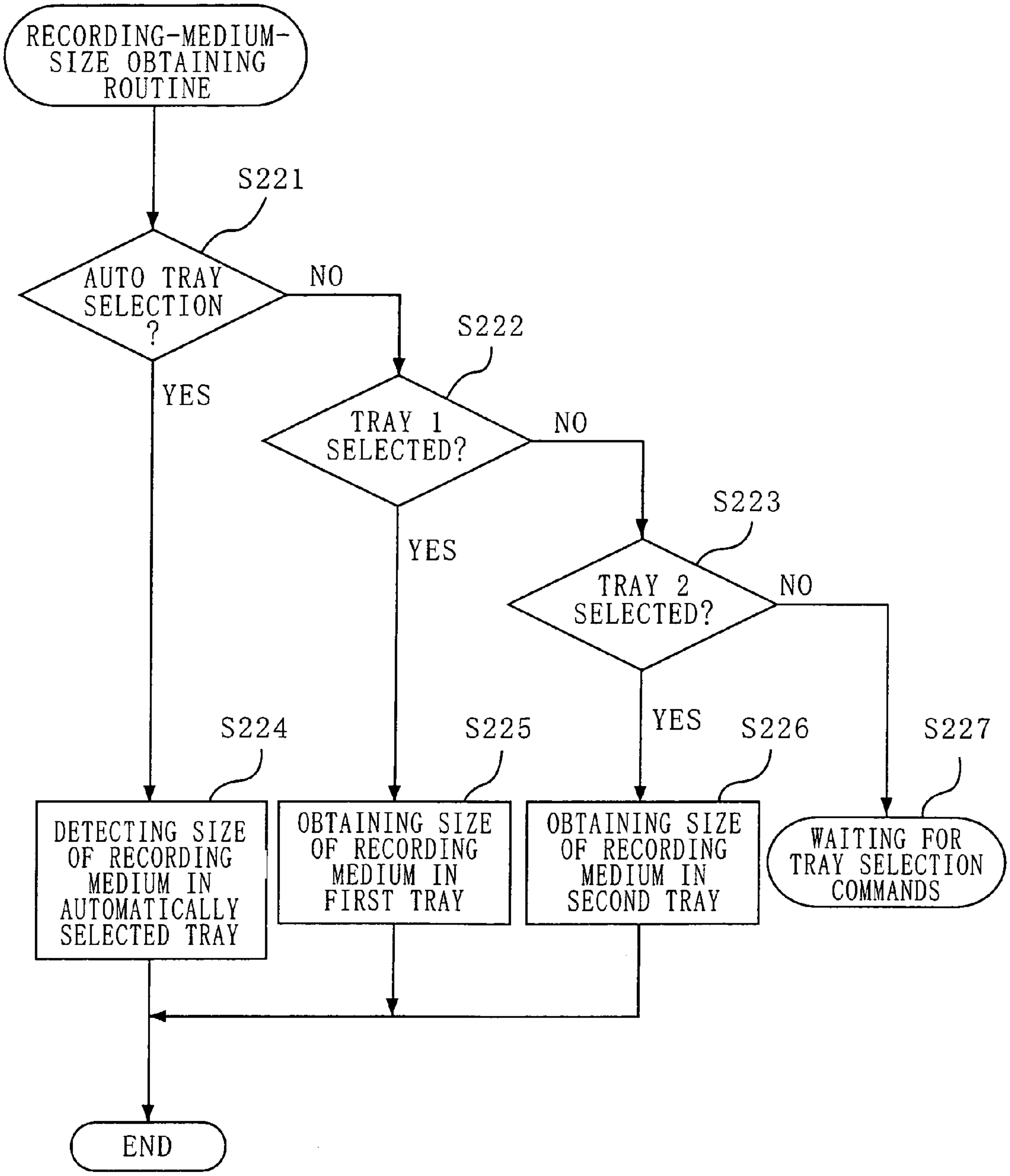
FIG. 7 is a flow chart illustrating a recording-medium-size obtaining routine executed by the facsimile apparatus in the image reading routine of FIG. 6.

The recording-medium-size obtaining routine executed in step S220 of the image reading routine of FIG. 6 is illustrated in the flow chart of FIG. 7. The recording-medium-size obtaining routine is initiated with step S221 to determine whether the tray selection data stored in the RAM 83 indicate the item "AUTO TRAY SELECTION" selected in the second item selection following the selection of the item 1 "GENERAL" of the main menu and the selection of the item 6 "TRAY SELECTION (COPY)" of the sub menu. If an affirmative decision (YES) is obtained in step S221, the control flow goes to step S224 to detect and thereby obtain the size of the recording medium accommodated in the automatically selected first or second tray 13*a*, 13*b*. The size of the recording medium in the selected tray 13*a*, 13*b* is detected by a suitable sheet-size detector provided for each tray 13*a*, 13*b*, as well known in the art. Where the detector is not provided, however, step S224 is modified to determine the size of the recording medium in the automatically selected first or second tray 13*a*, 13*b*, to be the legal size (largest size), irrespective of the size of the recording medium actually accommodated in the selected tray. In this case, the maximum image reading area is set in step S300.

If a negative decision (NO) is obtained in step S221, the control flow goes to step S222 to determine whether the tray selection data stored in the RAM 83 indicate the item "TRAY 1" selected in the second item selection following the selection of the item 1 "GENERAL" of the main menu and the selection of the item 6 "TRAY SELECTION (COPY)" of the sub menu. If an affirmative decision (YES) is obtained in step S222, the control flow goes to step S225 to obtain the size of the recording medium in the selected first tray 13*a*, on the basis of the recording-medium size data stored in the RAM 83 as a result of the second item selection following the selection of the item 1 "GENERAL" of the main menu, the selection of the item 2 "PAPER SIZE" of the sub menu, and the first item selection of the item 1 "TRAY 1".

If a negative decision (NO) is obtained in step S222, the control flow goes to step S223 to determine whether the tray selection data stored in the RAM 83 indicate the item 2 "TRAY 2" selected in the second item selection following the selection of the item 1 "GENERAL" of the main menu and the selection of the 6 item "TRAY SELECTION (COPY)" of the sub menu. If an affirmative decision (YES) is obtained in step S224, the control flow goes to step S226 to obtain the size of the recording medium accommodated in the selected second tray 13*b*, on the basis of the recording-medium size data stored in the RAM 83 as a result of the second item selection following the selection of the item 1 "GENERAL" of the main menu, the selection of the item 1 "PAPER SIZE" of the sub menu, and the first item selection of the item 2 "TRAY 2".

If a negative decision (NO) is obtained in step S223, the control flow goes to step S227 to wait for tray selection commands for storing the tray selection data in the RAM 83.

Step S210 and step S220 are followed by step S300 to set an image reading area of the original platen 4, on the basis of the size of the original obtained in step S210 or the size of the recording medium obtained in step S220 (in step S224, S225 or S226).

Step S300 is followed by step S400 in which the image of the original placed on the glass plate 26 of the original platen 4 is read by the scanner portion 3 under the control of the scanner control portion 35, according to the image reading area which has been set in step S300.

The above-indicated step S224 of the image reading routine corresponds to a recording-medium-size detector operable to detect the size of the recording medium, and the above-indicated step S220 corresponds to a recording-medium-size obtaining portion operable to obtain the size of the recording medium, while the above-indicated step S300 corresponds to an image-reading-area setting portion operable to set the image reading area of the original platen 4, according to the size of the original or recording medium set in the above-indicated step S210 or S220.

Figure 8:
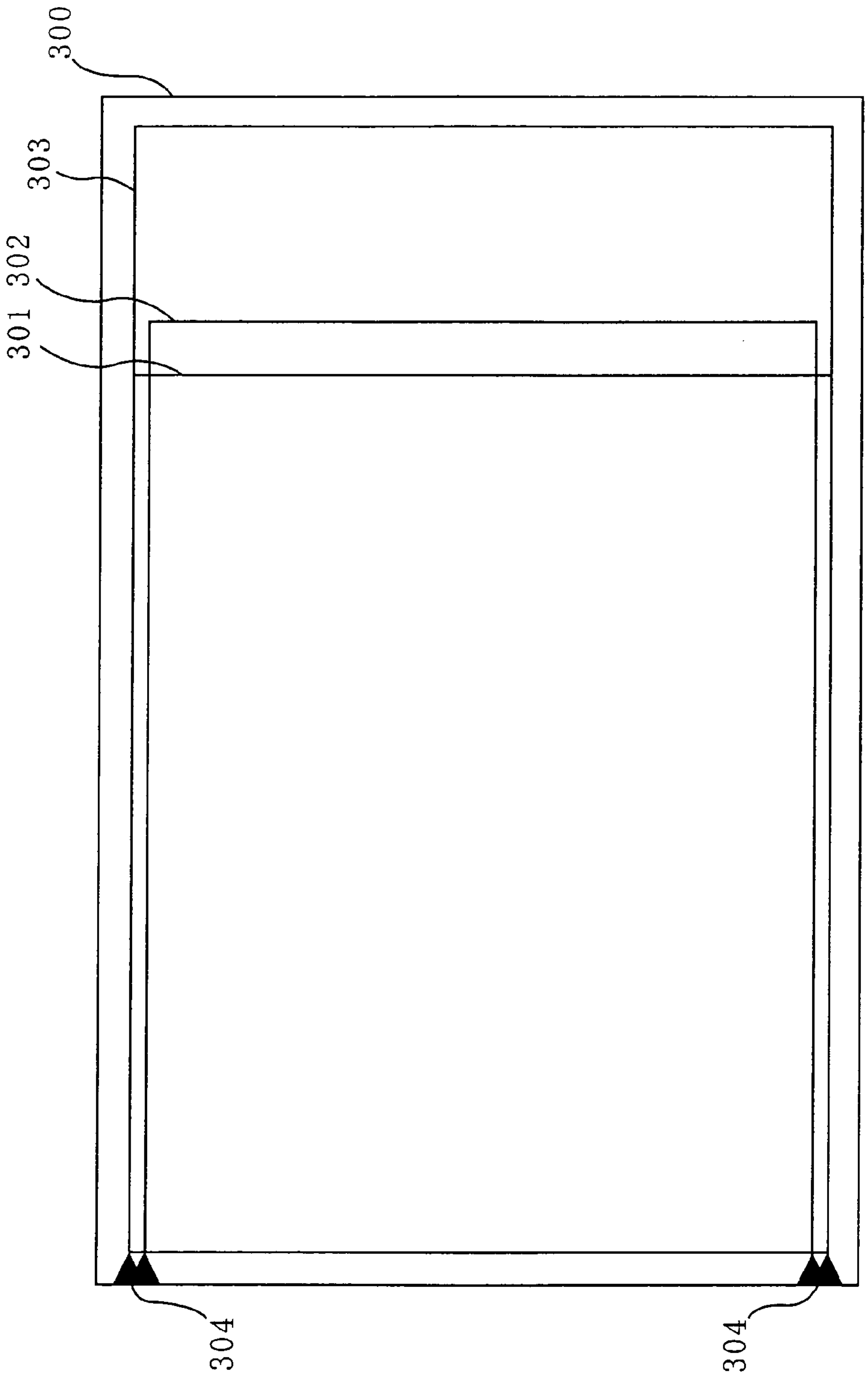
FIG. 8 is a view indicating image reading areas to be set according to the image reading routine.

Referring next to FIG. 8, there is shown the image reading area to be set according to the image reading routine. In FIG. 8, an outer frame 300 indicates a maximum area of the image reading surface of the glass plate 26 of the original platen 4 on which the original is placed. A letter-size frame 301, an A4-size frame 302 and a legal-size frame 303 respectively indicate the image reading areas of the image reading surface of the glass plate 26 of the sizes that are to be set for the letter, the A4 paper sheet and the legal paper sheet. Reference numeral 304 denotes original positioning marks which are provided on the glass plate 26, as reference positions used for positioning the original on the glass plate 26 so that the image on the thus positioned original is read on the basis of the image reading area set according to the image reading routine described above.

According to the image reading routine described above, the facsimile transmission by the facsimile apparatus 1 is effected such that the image on the original placed on the original platen 4 is read by the scanner portion 3, in the image reading surface area of the glass plate 26 which has been set on the basis of the size of the original specified by the user in the function setting mode. The image data representative of the read image are fed from the scanner control portion 35 to the encoder 85, which in turn encodes the image data received from the scanner control portion 35, to generate image data in the facsimile transmission format, so that the generated image data are transmitted from the MODEM 89 to an external facsimile receiver through the line control portion 53 and the telephone line network.

When the image on the original is copied or reproduced, the image reading area in the original platen 4 is set on the basis of the size of the recording medium specified by the user in the function setting mode or the detected size of the recording medium, and the image on the original placed on the original platen 4 is read by the scanner portion 3, in the set image reading area. The image data representative of the read image are fed from the scanner control portion 35 to the printer control portion 37, which in turn controls the printer portion 2 to print the image on the recording medium according to the image data received from the scanner control portion 35.

The present embodiment of this invention constructed as described above is arranged to prevent reading an area of the glass plate 26 of the original platen 4 that is larger or smaller than the size of the original, during facsimile transmission through a communication line (e.g., telephone line network or communication cable), for thereby preventing an unnecessary blank space formed on the recording medium on which the image is to be printed on the external facsimile receiver, and preventing a failure to transmit facsimile data representative of the entire image of the original, which results in only partial formation of the desired image on the recording medium in the external facsimile receiver. Further, the present embodiment permits reading of the image of the original according to the size of the original specified by the user, without detecting the size of the original. Accordingly, the present embodiment eliminates a need of performing a pre-scanning operation to detect the size of the original prior to the image reading operation, so that the time required for reading the image of the original can be reduced, and the image can be read with high efficiency. In addition, the present embodiment eliminates an original-size sensor for detecting the size of the original, so that the scanner portion 3 can be simplified in construction.

The present embodiment is further arranged to prevent reading an image reading area larger or smaller than the size of the recording medium, during a copying operation. In addition, the present embodiment permits the user to specify the size of the original or recording medium through the operator's control panel 27, prior to the facsimile transmission or copying operation started by the FAX START key 272 or the COPY key 276, so that the image on the original in the image reading area which corresponds to the specified size can be read during the facsimile transmission or copying operation.

In the present embodiment, one of the letter size, A4 size and legal size can be selected as the sizes of the original and the recording medium, to specify the image reading area. However, any other sizes not larger than the maximum readable area in the original platen 4 may be selected in the second item selection, as desired.

It is to be understood that the present invention is not limited to the details of the illustrated embodiment, but may be embodied with various changes and modifications, which may occur to those skilled in the art. While the illustrated embodiment is arranged to set the image reading area when the image is read for facsimile transmission of a desired image to an external facsimile receiver or for copying (reproduction) of a desired image on the recording medium, the image reading area of the original plate 4 may be set when the image is read for transmission of image data to an external personal computer. As described above, the illustrated facsimile apparatus 1 is provided with the PC I/F 24 through which the image data can be transmitted to an external personal computer (PC). In this case, the image reading area is set when the image is read for transmission to the external PC, as well as when the image is read for copying on a recording medium.

Described in detail, the user first selects an item "IMAGE TRANSMISSION TO PC" of the main menu (which item is not shown in FIG. 5), and then selects the item "ORIGINAL SIZE" of the sub menu, as in the case where the item 2 "FAX" of the main menu is selected. Then, one of the item "LETTER/A4" and the item "LEGAL" is selected in the second item selection. Further, the step S110 of the image reading routine illustrated in the flow chart of FIG. 6 is modified so as to determine whether an operation of the facsimile apparatus 1 to transmit image data to an external PC has been requested. If an affirmative decision (YES) is obtained in this modified step S110, the control flow goes to step S210 to obtain the recording-medium-size data stored in the RAM 83 as a result of the second item selection by the user, and to step S300 to set the image reading area of the original platen 4, on the basis of the size of the original represented by the obtained recording-medium-size data. Then, the control flow goes to step S400 in which the CPU 39 commands the scanner control portion 35 to control the scanner portion 3 for reading the image of the original placed on the original platen 4, on the basis of the image reading area set in step S300, so that image data obtained by reading the image are transmitted to the external PC through the PC I/F 24.

As described above, the size of the recording medium is used to set the image reading area of the original platen 4 when the image of the original is read to obtain image data used to control the printer portion 2 to print the image on the recording medium. When the image of the original on the original platen 4 is read to obtain image data not used to control the printer portion 2, on the other hand, the specified size of the original is used to set the image reading area of the original platen 4.

When the image of the original fed from the original supply tray 18 by the ADF mechanism 16 is read to obtain image data not used to control the printer portion 2, the specified size of the original is used to set the image reading area of the original, that is, the width dimension of an area of the original to be read by the CCD unit 32. Namely, the width dimension of the image reading area of the original in the direction of extension of the CCD unit 32 is set on the basis of the specified size of the original.

What is claimed is:

1. An image processing apparatus comprising:

an image reading portion operable to read an image on an original, to obtain image information;

an image-information outputting portion operable to output said image information to an external device;

an image recording portion operable to record an image on a recording medium, on the basis of said image information obtained by said image reading portion;

an original-size specifying portion operable to specify a size of said original;

a recording-medium-size obtaining portion operable to obtain a size of said recording medium; and an image-reading-area setting portion operable to set an image reading area of said image reading portion, on the basis of the size of said original specified by said original-size specifying portion, upon operation of said image-information outputting portion, and to set said image reading area, on the basis of the size of said recording medium obtained by said recording-medium-size obtaining portion, upon operation of said image recording portion.

2. An image processing apparatus according to claim 1, further comprising an original platen on which said original is placed when said image on said original is read by said image reading portion.

3. An image processing apparatus according to claim 1, wherein said image-information outputting portion includes communication means for transmitting said image information to said external device through a communication line.

4. An image processing apparatus according to claim 3, wherein said image-information outputting portion includes a modulator-demodulator, and said external device is an external facsimile receiver which receives said image information through said modulator-demodulator.

5. An image processing apparatus according to claim 3, wherein said image-information outputting portion includes a personal-computer interface, and said external device is an external personal computer which receives said image information through said personal-computer interface.

6. An image processing apparatus according to claim 1, wherein said recording-medium-size obtaining portion includes an input device manually operable to input said size of said recording medium.

7. An image processing apparatus according to claim 6, wherein said image recording portion includes a plurality of trays for accommodating respective stacks of paper sheets, each of said paper sheets being provided as said recording medium, and said input device includes manually operable members through which sizes of the paper sheets of said stacks respectively accommodated in said plurality of trays are specified, said image-reading-area setting portion setting said image reading area of said image reading portion upon operation of said image recording portion, on the basis of the size of the paper sheets in a manually selected one of said plurality of trays, which size has been specified through said manually operable members, said one of said plurality of trays being manually selected through said manually operable members.

8. An image processing apparatus according to claim 1, wherein said recording-medium-size obtaining portion includes a recording-medium-size detector operable to detect said size of said recording medium.

9. An image processing apparatus according to claim 8, wherein said image recording portion includes a plurality of trays for accommodating respective stacks of paper sheets, each of said paper sheets being provided as said recording medium, and said image-reading-area setting portion setting said image reading area of said image reading portion upon operation of said image recording portion, on the basis of the size of the paper sheets in an automatically selected one of said plurality of trays, which size has been detected by said recording-medium-size detector.

10. A method of setting an image reading area of an image reading portion of an image processing apparatus, said image reading portion being operable to read an image on an original, to obtain image information, said image processing apparatus further including an image-information outputting portion operable to output said image information to an external device, and an image recording portion operable to record an image on a recording medium, on the basis of said image information obtained by said image reading portion, said method comprising the steps of:

setting said image reading area of said image reading portion, on the basis of a size of said original, upon operation of said image-information outputting portion; and setting said image reading area, on the basis of a size of said recording medium, upon operation of said image recording portion.

11. A method according to claim 10, wherein said step of setting said image reading area upon operation of said image recording portion comprises manually inputting said size of said recording medium before said image on said original is read by said image reading portion.

12. A method according to claim 11, wherein said image recording portion includes a plurality of trays for accommodating respective stacks of paper sheets, each of said paper sheets being provided as said recording medium, and said step of setting said image reading area upon operation of said image recording portion comprises specifying sizes of the paper sheets of said stacks respectively accommodated in said plurality of trays, through manually operable members, and setting said image reading area of said image reading portion upon operation of said image recording portion, on the basis of the size of the paper sheets in a manually selected one of said plurality of trays, which size has been specified through said manually operable members, said one of said plurality of trays being manually selected through said manually operable members.

13. A method according to claim 10, wherein said step of setting said image reading area upon operation of said image recording portion comprises detecting said size of said recording medium before said image on said original is read by said image reading portion.

14. A method according to claim 13, wherein said image recording portion includes a plurality of trays for accommodating respective stacks of paper sheets, each of said paper sheets being provided as said recording medium, and said step of setting said image reading area upon operation of said image recording portion comprises setting said image reading area of said image reading portion upon operation of said image recording portion, on the basis of the size of the paper sheets in an automatically selected one of said plurality of trays, which size has been detected by a detector.

15. A method according to claim 10, wherein said step of setting said image reading area upon operation of said image-information outputting portion comprises manually specifying said size of said original before said image on said original is read by said image reading portion.

* * * * *